United States Patent [19]
Trapp et al.

[11] Patent Number: 6,071,321
[45] Date of Patent: Jun. 6, 2000

[54] E-1 AIR DRYER LIQUID SEPARATOR WITH BAFFLE

[75] Inventors: Scott M. Trapp, Charlotte, N.C.;
Michael V. Kazakis, Simpsonville; T. Kevin Castle, Wellford, both of S.C.

[73] Assignee: Westinghouse Air Brake Company, Wilmerding, Pa.

[21] Appl. No.: 08/978,796

[22] Filed: Nov. 26, 1997

[51] Int. Cl.[7] ............................ B01D 19/00; B01D 24/16; B01D 45/16; B01D 53/04

[52] U.S. Cl. ............................... 55/318; 55/337; 55/419; 55/426; 55/432; 55/459.1; 55/DIG. 17; 96/134; 96/188; 34/80

[58] Field of Search .................... 55/337, 413, 424, 55/426, 432, 459.1, DIG. 17, 318, 419; 96/134, 209, 188; 34/80

[56] References Cited

U.S. PATENT DOCUMENTS

| | | | |
|---|---|---|---|
| 2,943,698 | 7/1960 | Bishop | 55/337 |
| 3,483,677 | 12/1969 | Pinto | 55/DIG. 17 |
| 3,877,904 | 4/1975 | Lowrie | 55/426 |
| 4,149,861 | 4/1979 | Sogo et al. | 55/426 |
| 4,853,010 | 8/1989 | Spence | 55/426 |

*Primary Examiner*—David A. Simmons
*Assistant Examiner*—Robert A. Hopkins
*Attorney, Agent, or Firm*—James Ray & Associates

[57] ABSTRACT

In a centrifugal separator for separating a liquid from a compressed gas, a baffle is provided to separate the centrifugal chamber into an upper sub-chamber and a lower sub-chamber but does not contact the walls of the chamber thereby being insufficient to prevent downward flow of separated liquid along the interior wall of the two sub-chambers, and insufficient to prevent flow of compressed gas from one sub-chamber to the other sub-chamber, the baffle nevertheless being sufficient to prevent turbulent gas flow in the lower sub-chamber when collected liquid is drained therefrom.

11 Claims, 5 Drawing Sheets

E-1 AIR DRYER LIQUID SEPARATOR WITH BAFFLE

CROSS REFERENCE TO RELATED APPLICATIONS

The invention taught in this patent application is closely related to the inventions taught in U.S. Pat. Nos. 5,423,129, 5,604,991 and 5,685,896; and is further closely related to the following copending patent applications: "Control Valve With Axial Sealing", Ser. No. 08/978,551, now U.S. Pat. No. 6,000,432; "Shuttle Mechanism For Twin Tower Air Dryer System", Ser. No. 08/979,198, now U.S. Pat. No. 5,901,459; "Purge Tube With Flapper Valve For Desiccant Containing Air Drier", Ser. No. 08/979,197 now U.S. Pat. No. 5,930,910; "E-1 Twin Tower Air Dryer For An Air Compressor Unit", Ser. No. 08/979,649 now U.S. Pat. No. 5,901,464; all of which are being filed concurrently herewith. All of the above-referenced patents and patent applications are assigned to the assignee of this invention. Additionally, the teachings of each of these issued and co-pending patent applications is incorporated herein by reference thereto.

FIELD OF THE INVENTION

The present invention generally relates to a new and improved centrifugal liquid-gas separator. More particularly, the present invention pertains to a centrifugal separator for removing a liquid phase from a compressed gas, the centrifugal separator having a baffle to divide the separator chamber into two sub-chambers which function to better and more completely separate the liquid from the compressed gas by reducing turbulence in the lower chamber when the drain valve is opened to drain the accumulated liquid therefrom.

BACKGROUND OF THE INVENTION

It will be appreciated that a Westinghouse Air Brake Company C-1 air dryer is designed to remove moisture from compressed air for use in a compressed air system as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously had a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system.

Indeed, the desiccant media adequately exsiccates only after the system has been turned off for a prolonged time sufficient to accomplish same. While the twin tower system has a greatly increased water removing capacity, it is still not as great as would be desired for completely trouble free operation. Accordingly, other types of water removing systems have been considered and examined for combining into the above twin tower system in an effort to maximize its water removing capability. Most such systems, however, require the use of moving parts or coalescing filters which would significantly increase maintenance costs or unduly complicate the system.

One system which does not include moving parts or filters is a centrifugal separator, which has been shown to be rather effective for removing moisture from air in low pressure systems. Indeed, centrifugal separators have been utilized in twin tower air drying systems, but with only a moderate degree of success. In a compressed air system where the air is conveyed under a considerable pressure, the high pressure of the compressed air causes a very significant turbulence within the centrifugal separator when the drain is opened to permit the water to be drained therefrom. This turbulence causes the surface tension of any separated water within the separator to be broken-up to such a degree that water is caused to redissolve within the turbulent compressed air, thereby virtually defeating the very purpose for the separator. In essence, the centrifugal forces in the upper portion of the separator will effect the desired separation. However, when any volume of water is drained from the lower portion of the separator, there is such a pressure differential effected within the separator that excessive turbulence results, thereby causing a major portion of the separated water to redissolve into the turbulent compressed air. Because of the significant amounts of moisture normally present in compressed air as provided by a conventional air compressor, it is not possible to effectively utilize such a separator in a pressurized air cleaning system without the need to drain water therefrom at intervals frequent enough to seriously diminish the separator's merit.

SUMMARY OF THE INVENTION

This invention is predicated upon our conception and development of a new and improved centrifugal separator for separating a liquid phase from a compressed gas phase, and particularly for separating water or moisture from compressed air. The inventive centrifugal separator includes a baffle or separator disk within the centrifugal chamber which serves to separate the centrifugal chamber into an upper sub-chamber and a lower sub-chamber. The baffle, however, does not contact the circular walls of the chamber so that it is insufficient to prevent the downward flow of separated water along the interior wall of the separator, or to prevent flow or movement of compressed air from one sub-chamber to the other. Nevertheless, the baffle will be sufficient to prevent, or at least significantly minimize, air turbulence, at least within the lower sub-chamber when collected water is drained therefrom. With any such significantly reduced turbulent flow, the brake-up of surface tension of collected water in the lower sub-chamber is significantly reduced so that the tendency for such water to redissolve into the compressed air is significantly minimized.

In essence, therefor, the centrifugal separator of this invention is particularly ideal for separating a liquid from a compressed gas, and particularly for separating water from compressed air, which pursuant to conventional centrifugal separators comprises a chamber having a generally circular interior wall, either cylindrical or conical, with a vertically disposed axis, and at least one tangential inlet for admitting the mixture of compressed gas and liquid into the chamber such that the mixture is caused to cyclonically revolve within the separator chamber at a velocity sufficient to cause the liquid to collect on the circular interior wall as a result of centrifugal forces, and flow downwardly along the interior wall as a result of gravitational forces. Normally, a sump is provided within the chamber which is adapted to collect the liquid flowing downwardly along the interior wall, an outlet provided for draining the collected liquid from the sump. An air vent is also provided in an upper portion of the chamber for permitting the compressed gas to exit from the chamber after the liquid has been separated therefrom.

The crux of this invention resides in a baffle or separator disk which is horizontally disposed within the chamber having a generally circular edge spaced from the interior wall sufficiently to generally separate such chamber into an upper sub-chamber and a lower sub-chamber but insufficient to prevent downward flow of separated liquid downwardly along the interior wall, so that such flow will progress from the upper sub-chamber into the lower sub-chamber. The baffle is preferably further provided with a plurality of apertures circumferentially spaced around the perimeter adjacent to the circular edge. Accordingly, while the separator will continue to function as a conventional centrifugal separator within an air drying system, with the separated water collecting on the circular interior wall and flowing downwardly into the sump with the separated air being concentrated at the axis and continuously exiting through an axial outlet, the baffle causes the cyclonic motion to be concentrated within the upper sub-chamber so that when the collected water is drained from the sump, any turbulent motion thereof caused by the pressure differential created in the lower sub-chamber will be significantly reduced, thereby also significantly reducing any tendency for the separated water in the lower sub-chamber to be redissolved into the de-watered air.

While it is believed that the centrifugal separator as described above is unique and novel in and of itself as a liquid-gas separator, its incorporation into a compressed air drying system utilizing a desiccant, as described above, is also unique and novel in that a significant volume of water is removed from the compressed air before the compressed air is conveyed through the desiccant for further and more complete drying. Indeed, the combination of the unique centrifugal separator of this invention with a twin tower, or even a single tower, air drying system utilizing a desiccant the compressed air can be dried to an exceptionally dry and clean level so that even if the temperature thereof is significantly reduced, the dew point can be maintained low enough that water is not caused to condense therefrom. Accordingly, the combination provides a much improved air cleaning and drying system without adding significantly to the overall cost of the system, and without adding any moving parts or complicated parts which would add to the system's maintenance costs.

OBJECTS OF THE INVENTION

It is, therefore, a primary object of the present invention to provide a new and improved centrifugal separator particularly suited for separating a liquid phase from a compressed gaseous phase, and ideally suited for separating water or moisture from compressed air.

It is another object of this invention to provide a separator for removing liquid or moisture from a compressed gas which does not include any moving parts or require frequent maintenance.

A further object of this invention is to provide an improved centrifugal separator for removing liquid or moisture from a gas which works adequately even though the inlet gas may be under significant pressure.

It is still another object of this invention to provide a separator for removing liquid or moisture from a compressed gas which permits periodic draining of the separated liquid without causing turbulence within the separator of such magnitude as to redissolve any significant portion of the separated moisture back into the compressed gas.

An even further object of this invention is to provide a simple and low cost separator for removing water from compressed air as may be advantageously incorporated into a desiccant containing twin tower compressed air drying and cleaning system.

Still a further object of this invention is to provide a new and improved, desiccant containing, twin tower system for cleaning and drying compressed air in which the moisture content of the compressed air can be reduced to exceptionally low levels.

Still an even further object of this invention is to provide a new and improved, desiccant containing, twin tower system for cleaning and drying compressed air in which the moisture content of the compressed air is reduced before it is conveyed through the desiccant material thereby reducing the amount of water in need of removal from the desiccant during the purge cycle.

In addition to the above-described objects and advantages of the centrifugal separator of this invention, various other objects and advantages of the present invention will become more readily apparent to those persons who are skilled in the same and related arts from the following more detailed description of the invention, particularly, when such description is taken in conjunction with the attached drawing figures and the appended claims.

DETAILED DESCRIPTION OF THE PREFERRED EMBODIMENTS OF THE INVENTION

Before describing the present invention in detail, for the sake of clarity and understanding, it is noted that identical components having identical functions in each of the accompanying drawings have been marked with the same reference numerals throughout each of the several Figures illustrated herein.

Figure 1:
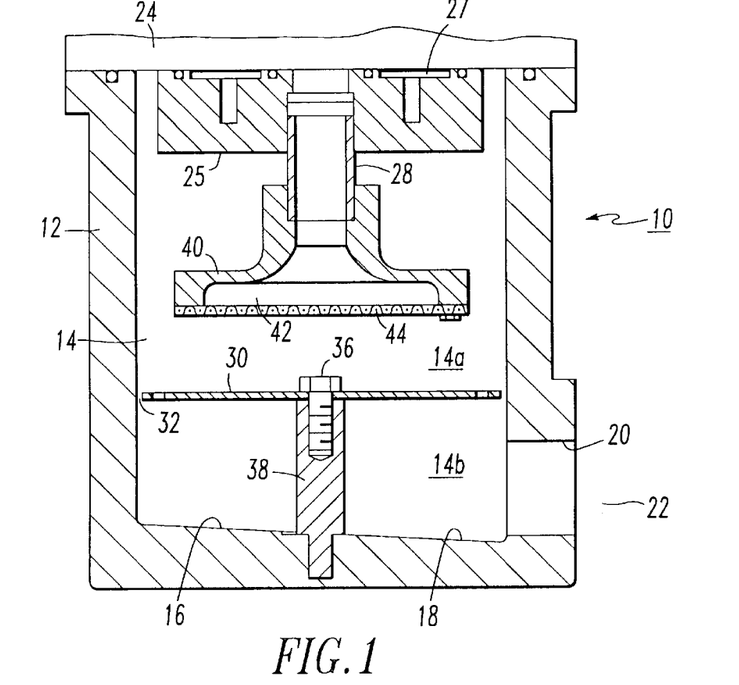
FIG. 1 is a cross-sectional side view of a centrifugal separator according to a presently preferred embodiment of this invention wherein the separator has a cylindrical chamber.
Figure 2:
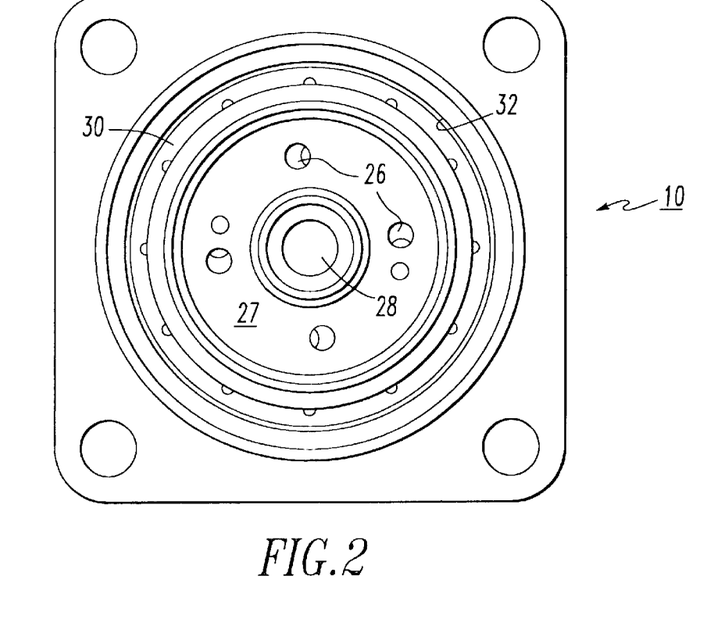
FIG. 2 is a top view of the centrifugal separator shown in FIG. 1 with the cover removed so that the interior of the chamber can be viewed.
Figure 4:
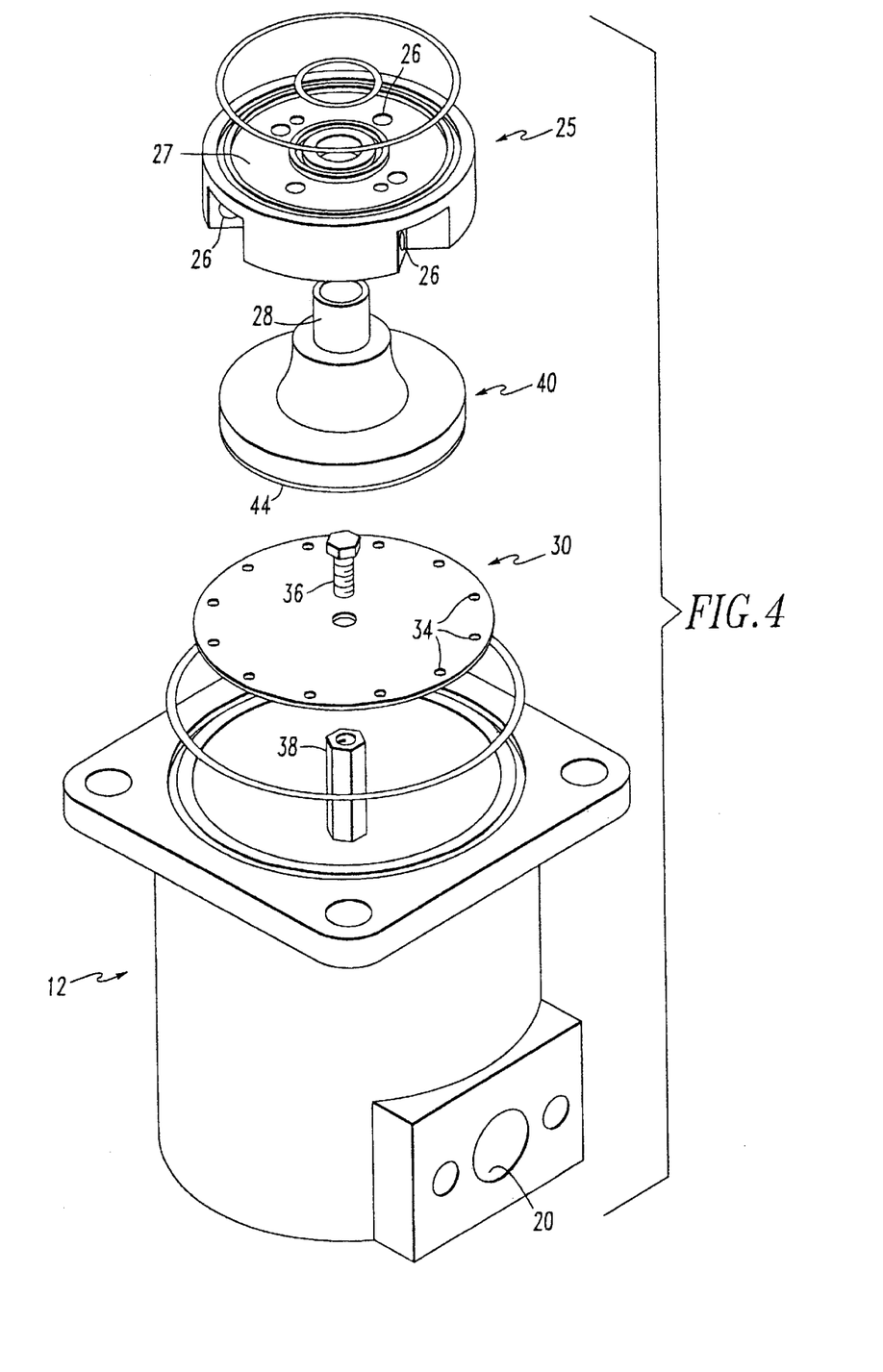
FIG. 4 is an exploded view of the centrifugal separator shown in FIGS. 1–2.

Reference to FIGS. 1–2 and 4 will illustrate a presently preferred embodiment of the centrifugal separator 10 of this invention for separating water from compressed air. Although the separator as disclosed could be utilized for separating other liquid phases from other gaseous phases, the description below will address the separation of water from compressed air, particularly as utilized in a twin tower air cleaning system for a railway train. In the centrifugal separator illustrated in FIGS. 1–2 and 4, the separator 10 comprises a cylindrical canister-like body 12 having a cylindrical chamber 14 therein with a generally cylindrical interior wall with a vertically disposed axis. The base of cylindrical chamber 14 is provided with a sloped floor 16, which in essence forms a floor of a sump 18 for collecting separated water after it is separated from the compressed air. A drain outlet 20 having a valve 22 is provided to controllably drain collected water from the sump 18.

A cover member 24 is provided not only to close chamber 14, but to provide inlet means 25 for admitting the mixture to be separated (i.e., moist compressed air) into chamber 14. As shown in the figures, the cover 24 and inlet means 25 are independent components, with the inlet means 25 bolted to the undersurface of cover member 24, as in actual practice, it is intended that the centrifugal separator 10 will be attached to the bottom of the casting containing the twin towers. As can be seen in FIGS. 4, and 6–9, inlet means 25 is provided with four inlet ports 26 for admitting the air-water mixture into chamber 14 tangentially to the circular configuration of chamber 14. Specifically, the upper side of inlet means 25 is provided with an annular chamber 27 into which the compressed gas is admitted, and the tangent inlet ports 26 are each in communication with the annular chamber 27. Annular chamber 27 is closed by being bolted against cover member 24. Accordingly, the incoming moist air will be caused to cyclonically revolve within chamber 14 at a velocity sufficient to cause the water to condense and collect on the cylindrical interior wall of chamber 14 as a result of centrifugal forces, and as the concentration thereof increases, to flow downwardly along that interior wall as a result of gravitational forces, eventually collecting as a pool in the sump 18. The compressed air, on the other hand, having a lower mass than the water, will continue its cyclonic motion eventually concentrating at the axial center of chamber 14 when it is relatively dry. An air vent 28 axially disposed through cover member 24 is provided for permitting the compressed air to exit from chamber 14 after a major portion of the water therein has been removed.

As above described, the centrifugal separator 10 is adapted for semi-continuous operation, whereby the inlet moist air is continuously admitted via inlet ports 26 to maintain a defined air pressure within the separator, while de-watered compressed air is continuously allowed to egress from the centrifugal separator 10 via air vent 28. The only part of the system that is not continuous is the water drain 20, which is intended to be opened only periodically, as necessary to drain accumulated water from sump 18 without allowing compressed air to exit via drain 20. The principle and physical phenomenon of centrifugal separation as generally described above is well known and need not be further explained here.

The crux of this invention resides in the baffle or separator disk 30 horizontally disposed within chamber 14 having a generally circular edge spaced from the interior wall of chamber 14 sufficiently to generally separate chamber 14 into an upper sub-chamber 14a and a lower sub-chamber 14b, but insufficient to prevent downward flow of centrifugally separated water collected on the interior wall of chamber 14 so that the water can flow downwardly along the interior wall from upper sub-chamber 14a and into the lower sub-chamber 14b. Accordingly, a space 32 is provided around baffle 30 between the edge of the baffle 30 and the circular surface of the wall forming chamber 14, through which condensed water will continue to flow as a result of gravitational forces, with the water continuing to collect in sump 18. While air will also readily pass between the two sub-chambers via space 32, baffle 30 is provided, preferably, with a plurality of apertures 34 circumferentially spaced around the perimeter of baffle 30 adjacent to the circular edge thereof through which compressed air can flow to the extent necessary to prevent a differential pressure between the two sub-chambers 14a and 14b. Clearly, the objective is that sub-chambers 14a and 14b should not be sealed from each other, but rather spaced apart by the baffle 30 so that the cyclonic air movement in sub-chamber 14a does not cause turbulent air movement in sub-chamber 14b, at least to an extent sufficient to cause water content in sub-chamber 14b to be redissolved into compressed air from which it had previously been removed when the drain valve 22 is opened. Indeed, baffle 30 will function to permit the cyclonic air movement to be concentrated within the upper sub-chamber 14a. When drain valve 22 is opened, a differential air pressure within the centrifugal separator 10 will cause a greater degree of the cyclonic air movement to be transferred into the lower sub-chamber 14b, but normally without sufficient turbulence as necessary to significantly brake-up the surface tension of the water within the lower sub-chamber 14b as to cause significant re-dissolution of water back into the de-watered air.

As can be seen in the Figures, baffle 30 is rigidly held in place by being axially attached to post 38 with a bolt 36. Post 38 is attached to the floor of sump 18 at the axis of chamber 14.

As shown in FIGS. 1–2 and 4, air vent 28 is preferably provided with an air scoop 40 generally having the shape of an inverted funnel with a large, oversized opening 42 at the bottom through which the de-watered air is admitted from the axial center of sub-chamber 14a and passed-on to air vent 28. A filter element such as a screen 44 is attached to the underside of opening 42 to filter-out particulate matter. The over-sized nature of opening 42 and filter element 44 will minimize the possibility of filter element 44 becoming clogged with particulate matter sufficient to prevent adequate exit of the de-watered air.

In operation, compressed air from a conventional air compressor (not shown) is admitted into chamber 14 via the four inlet ports 26 which are perpendicular to the radius and disposed at 90 degrees intervals so that the compressed air enters chamber 14 tangentially to the axis causing a cyclonic, rotating motion of the compressed air within chamber 14. As is known, centrifugal forces resulting from the cyclonic motion will cause the heavier molecules; i.e., water molecules and particulate matter to be forced towards the outer perimeter of the rotating gas, while the lighter, de-watered air is forced inwardly concentrating at the axis of rotation. The centrifugal forces acting on the water molecules and particulate matter will cause the water molecules to condense on the circular wall of chamber 14, and the gravitational forces will, in turn, cause the water to flow downwardly along the interior surface of the wall, eventually being collected in a pool in sump 18. Because of the space 32, baffle 30 will not prevent such downward movement of the water or particulate matter to sump 18. At the same time, the de-watered air concentrated at the axis of rotation; i.e., axis of chamber 14, will be forced by the incoming compressed air to exit via air scoop 40 and out of the centrifugal separator 10 via air vent 28. Accordingly the volume and rate of de-watered air exiting via air vent 28 will be equal to the volume and rate of compressed air entering the separator via inlet ports 26.

At periodic intervals, as the water level in sump 18 reaches a predetermined fill level, the separated water is drained from sump 18 via drain outlet 20 by appropriately opening drain valve 22. Normally, when such a drain valve is opened, the compressed air within chamber 14 will not only readily force water in sump 18 to exit via drain outlet 20, but a significant pressure differential is created within chamber 14 as will cause considerable air turbulence within chamber 14. In fact, such a turbulence is normally so significant that water in sump 18, as well as water flowing downwardly on the wall of chamber 14, is agitated to an extent that its surface tension is considerably broken thereby causing a significant amount of water to be redissolved into the de-watered air from which it had just been removed. Accordingly, the turbulent action resulting from opening drain valve 22 tends to significantly defeat the de-watering effect being sought by the centrifugal separation. Pursuant to this invention, however, the presence of baffle 30 tends to significantly concentrate to the cyclonic air movement, as well as the turbulent air movement resulting from an open drain valve 22, within the upper sub-chamber 14a, with the result that there is only minor turbulent air movement within the lower sub-chamber 14b which is not significant enough to cause major amounts of the collected water to redissolve in the de-watered air.

Figure 3:
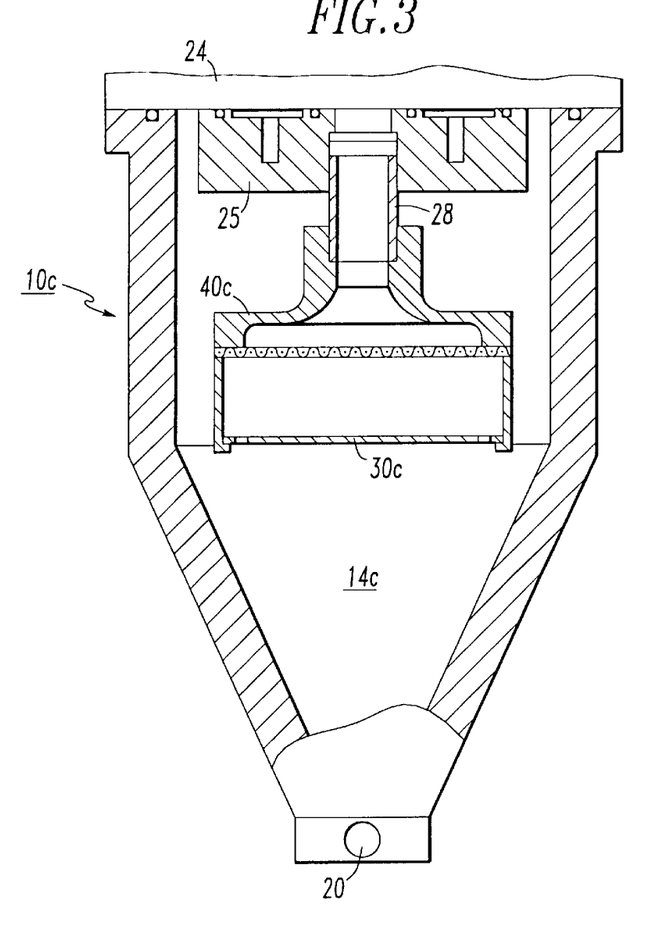
FIG. 3 is a cross-sectional side view substantially like that of FIG. 1 but showing the separator as having a conical chamber with the baffel suspended from above.

Reference to FIG. 3 will illustrate another embodiment of the centrifugal separator 10c differing primarily in that the chamber 14c is of conical configuration which may be preferred for some applications, and further in having the baffle 30c suspended from above, which eliminates any need for any baffle supporting elements attached to the interior chamber walls. As an added advantage to this embodiment, the air scoop 40c and baffle 30c can be formed as a single piece casting.

Figure 5:
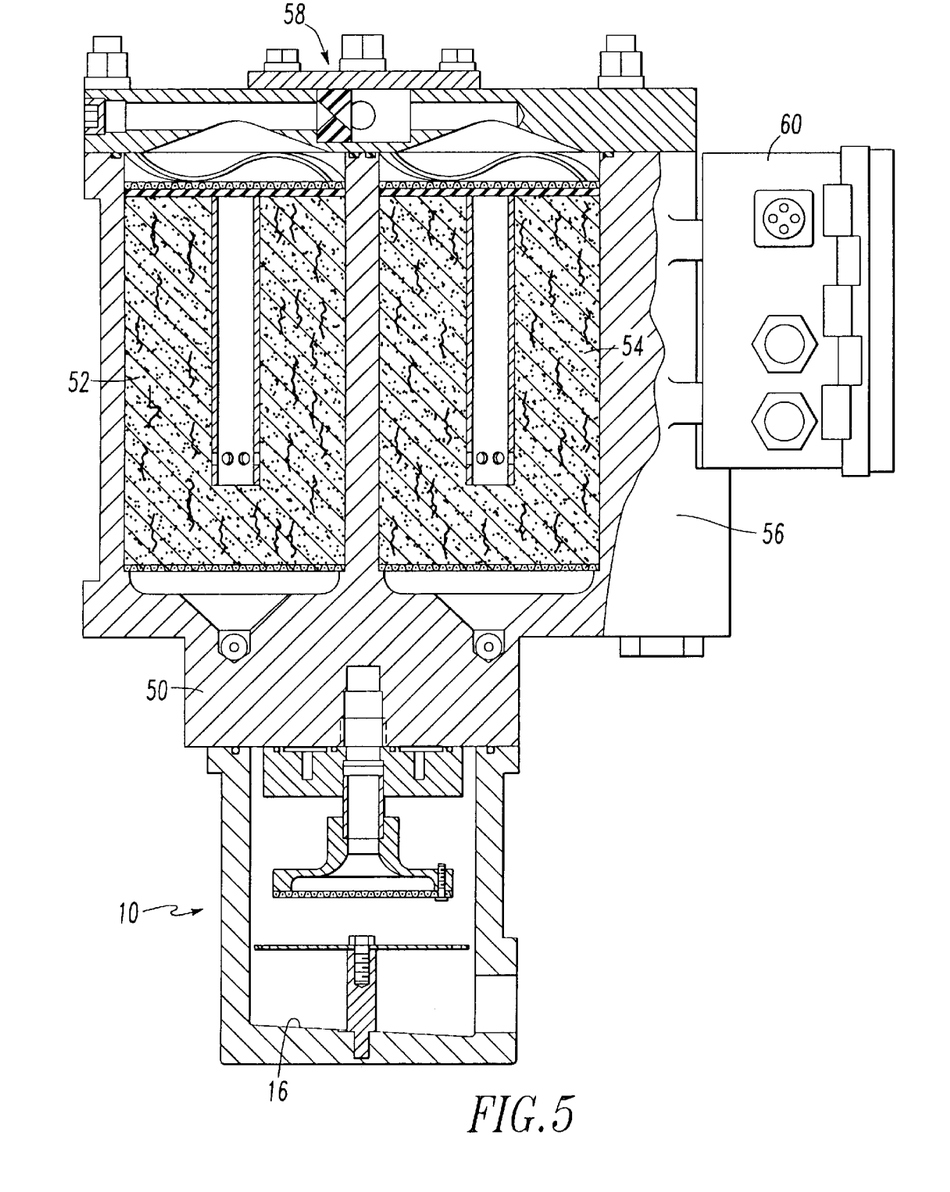
FIG. 5 is a cross-sectional view of a twin tower air cleaning system incorporating the centrifugal separator as illustrated in FIGS. 1–2 and 4, with the bottom of the centrifugal separator casting functioning as the cover for the centrifugal separator.
Figure 6:
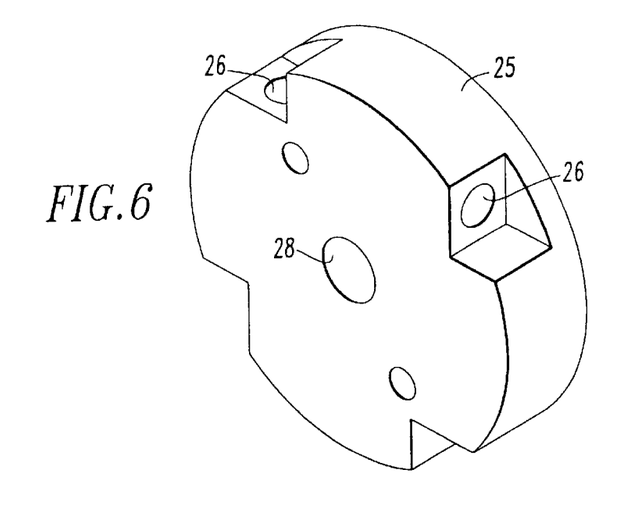
FIG. 6 is an isometric view of the inlet means for admitting the moist, compressed air into the centrifugal separator.
Figure 7:
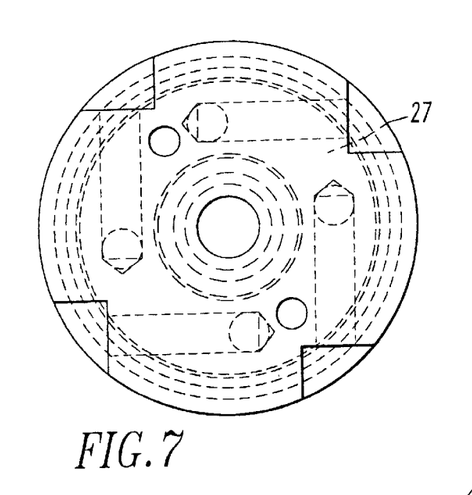
FIG. 7 is a plan view of the inlet means for admitting the moist, compressed air into the centrifugal separator.
Figure 8:
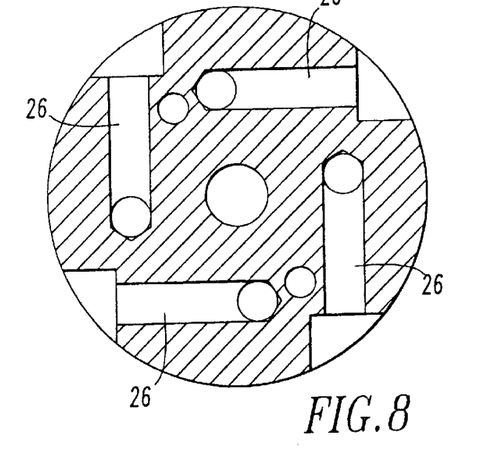
FIG. 8 is a cross-sectional plan view of the inlet means as shown in FIG. 7.
Figure 9:
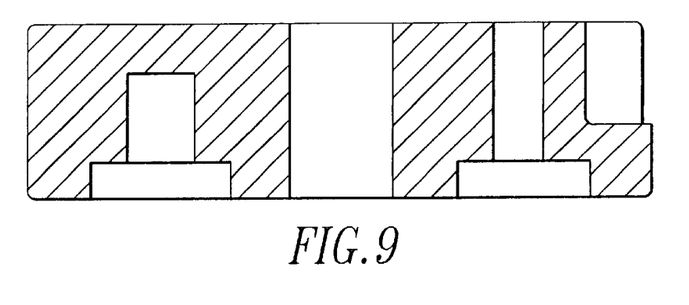
FIG. 9 is a cross-sectional side view of the inlet means shown in FIGS. 6–8.

Reference to FIG. 5 will illustrate how the separator 10 is incorporated into a twin tower air cleaning system as disclosed in the two patents cited above, namely U.S. Pat. Nos. 5,604,991 and 5,685,896. The prior art twin tower air cleaning system was designed to clean and dry a stream of unpurified pressurized air received from a source of compressed air such as an air compressor so as to supply a pneumatic system with purified dry air. The unpurified compressed air from a conventional air compressor typically contains the vapor of various substances as well as moisture in the form of water or other liquids such as various oils. For the sake of brevity, the terms vapor and moisture are herein collectively referred to as "moisture". The unpurified air will also typically contain other particulates such as dirt, dust, pollen and various other contaminants.

Referring to FIG. 5 the new and improved twin tower air drying system of this invention includes a centrifugal separator 10, as disclosed above, attached to the bottom side of the main structure body member 50, to which a pair of desiccant containing towers 52 and 54 are incorporated to extend vertically upward in a side-by-side relationship. Ideally, the desiccant media is a particulate material and contained within a porous replaceable cartridge or bag. A pair of control valves 56 are also provided within body member 50 for switching the flow of compressed air into either one of the two towers 52 or 54. A shuttle valve mechanism 58 is provided on top of body member 50, which operates in cooperation with the two control valves 56, to control the flow of the cleaned dry compressed air emerging from the two towers 52 and 54, a portion of which is conveyed to the pneumatic system and a portion of which is used in the purge cycle.

Pursuant to this invention, the moisture laden compressed air from the air compressor (not shown) is first passed into the inventive centrifugal separator 10 (as described above) which will eliminate a major portion of the moisture and particulate matter from the compressed air prior to its being further purified and dried in one of the twin towers 52 or 54. The compressed air from the air compressor is admitted into centrifugal separator 10 via inlet ports 26, substantially as described above. The compressed air is then significantly de-watered as described above and exits via air vent 28 were it is directed via one of the control valves 56 into the bottom of either tower 52 or 54, that is, which ever one is at that time functioning in the air drying cycle as controlled by the control valves 56. In passing upwardly through the desiccant within the tower (either 52 or 54) the compressed gas is further dried by the desiccant and emerges from the tower via the shuttle valve mechanism 58 for distribution in an output percentage to the pneumatic system and in a purge percentage back into the twin tower system. The purge percentage of the cleaned and dried air is used to purge one of the twin towers 52 or 54 of moisture it has previously collected, that is, that desiccant containing tower which at that time is functioning in the purge cycle. A timer 60 is provided to automatically switch the opening and closing of the control valves 56 so that for a predetermined period of time the compressed air is routed through tower 52, while the dried purge air is routed through tower 54. Then after that predetermined time, the control valves are switched so that the function of the two towers 52 and 54 are switched.

Having disclosed two embodiments of the centrifugal separator of this invention, it should be apparent that a number of different embodiments and modifications could be devised and incorporated without departing from the spirit of the invention. For example, centrifugal separators are known and used in a variety of different applications, all of which have features which could be incorporated into this invention if helpful. At the very heart of the invention, the baffle 30 could perhaps be provided in a variety of different forms. For example, for some applications it is possible that the apertures 34 could be varied or even eliminated, or perhaps even a screen material could be utilized as the baffle 30 in some applications.

We claim:

1. In an air drying system for drying and cleaning compressed air wherein compressed air from a conventional air compressor is passed through at least one porous cartridge containing a desiccant material for removing water from said compressed air, the improvement comprising passing said compressed air through a centrifugal separator to separate water from said compressed air before said compressed air is passed through said at least one porous cartridge, said centrifugal separator comprising; a chamber having a generally circular interior wall with a vertically disposed axis, a cover member to close the top of said chamber, at least one tangential inlet under said cover member for admitting a mixture of said liquid and said compressed gas into said chamber such that said mixture is caused to cyclonically revolve within said chamber at a velocity sufficient to cause said liquid to collect on said cylindrical interior wall as a result of centrifugal forces, and flow downwardly along said interior wall as a result of gravitational forces, a closure wall member at the bottom of said chamber forming a sump within said chamber adapted to collect said liquid flowing downwardly along said interior wall, an outlet for draining said collected liquid from said sump, an air vent extending generally through the center of said cover member for permitting said compressed air to exit from said chamber, a baffle in the shape of a circular disk horizontally disposed within said chamber having a generally circular edge spaced from said interior wall to separate said chamber into an upper sub-chamber and a lower sub-chamber and spaced from said interior wall to allow downward flow of said liquid along said interior wall from said upper sub-chamber into said lower sub-chamber, and said baffle having a plurality of apertures circumferentially spaced around the perimeter adjacent to said generally circular edge for permitting non-turbulent flow of said compressed gas from said lower sub-chamber to said upper sub-chamber.

2. An air drying system, according to claim 1, in which said generally circular wall is cylindrical.

3. An air drying system, according to claim 1, in which said generally circular wall is conical.

4. An air drying system, according to claim 1, in which said air vent is adapted to vent compressed air from the axial upper center of said chamber.

5. An air drying system, according to claim 4, in which said air vent is provided with an air scoop having the general shape of an inverted funnel with a large diameter opening axially aligned with said air vent, and having a filter screen disposed over said large diameter opening adapted to filter particulate matter from the compressed air exiting said air vent.

6. An air drying system, according to claim 1, in which said outlet for draining separated liquid from said sump includes a valve for selectively draining said collected liquid from said sump at predetermined intervals.

7. In an air drying system for drying and cleaning compressed air wherein compressed air from a conventional air compressor is passed through at least one porous cartridge containing a desiccant material for removing water from said compressed air, the improvement comprising passing said compressed air through a centrifugal separator to separate water from said compressed air before said compressed air is passed through said at least one porous cartridge, said centrifugal separator comprising; a chamber having a generally circular interior wall with a vertically disposed axis, a cover member to close the top of said chamber, at least one tangential inlet under said cover member for admitting a mixture of said liquid and said compressed gas into said chamber such that said mixture is caused to cyclonically revolve within said chamber at a velocity sufficient to cause said liquid to collect on said cylindrical interior wall as a result of centrifugal forces, and flow downwardly along said interior wall as a result of gravitational forces, a lower cover member to close the bottom of said chamber and to form a sump within said chamber adapted to collect said liquid flowing downwardly along said interior wall, an outlet for draining said collected liquid from said sump, an air vent extending generally through the center of said cover member for permitting said compressed air to exit from said chamber, said air vent provided with an air scoop having the general shape of an inverted funnel with a large diameter opening axially aligned with said air vent, a baffle in the shape of a circular disk horizontally disposed within said chamber having a generally circular edge spaced from said interior wall to separate said chamber into an upper sub-chamber and a lower sub-chamber and spaced from said interior wall to allow downward flow of said liquid along said interior wall from said upper sub-chamber into said lower sub-chamber, and said baffle having a plurality of apertures circumferentially spaced around the perimeter adjacent to said generally circular edge for permitting non-turbulent flow of said compressed gas from said lower sub-chamber to said upper sub-chamber.

8. An air drying system, according to claim 7, in which said generally circular wall is cylindrical.

9. An air drying system, according to claim 7, in which said generally circular wall is conical.

10. An air drying system, according to claim 7, in which said air vent is adapted to vent compressed air from the axial upper center of said chamber.

11. An air drying system, according to claim 7, in which said air scoop is provided with a filter screen disposed over said large diameter opening adapted to filter particulate matter from the compressed air exiting said air vent.

* * * * *